United States Patent [19]
Matsunawa

[11] Patent Number: 4,783,838
[45] Date of Patent: Nov. 8, 1988

[54] IMAGE PROCESSING METHOD AND APPARATUS THEREFOR

[75] Inventor: Masahiko Matsunawa, Hino, Japan

[73] Assignee: Konishiroku Photo Industry Co., Ltd., Tokyo, Japan

[21] Appl. No.: 813,050

[22] Filed: Dec. 24, 1985

[30] Foreign Application Priority Data

| Dec. 26, 1984 | [JP] | Japan | 59-279492 |
| Dec. 26, 1984 | [JP] | Japan | 59-279493 |
| Dec. 26, 1984 | [JP] | Japan | 59-279494 |
| Feb. 22, 1985 | [JP] | Japan | 60-34117 |
| Mar. 12, 1985 | [JP] | Japan | 60-49629 |
| Apr. 2, 1985 | [JP] | Japan | 60-70461 |

[51] Int. Cl.$^4$ .............................. G06K 9/36
[52] U.S. Cl. .................... 382/51; 358/283; 382/27
[58] Field of Search .......... 382/50, 51, 47, 27; 358/283, 282, 22, 180; 340/731

[56] References Cited

U.S. PATENT DOCUMENTS

| 4,074,231 | 2/1978 | Yajima et al. | 382/50 |
| 4,084,196 | 4/1978 | Tisue et al. | 358/283 |
| 4,090,188 | 5/1978 | Suga | 340/731 |
| 4,394,693 | 7/1983 | Shirley | 358/283 |
| 4,524,388 | 6/1985 | Abe et al. | 358/283 |
| 4,553,173 | 11/1985 | Kawamura | 358/283 |
| 4,610,026 | 9/1986 | Tabata et al. | 382/47 |
| 4,651,293 | 3/1987 | Kato | 358/283 |

Primary Examiner—Leo H. Boudreau
Attorney, Agent, or Firm—Bierman and Muserlian

[57] ABSTRACT

An image processing method wherein a binary image is divided into blocks, at least one of the number of black picture elements and the number of white picture elements for each of the divided block of binary image are counted, and a tonal image is restored on the basis of the counted number from the binary image. An image processing apparatus for obtaining an expanded image or a contracted image by effecting a predetermined image processing for an image matrix consisting of binary data, having a device for instructing the gradation processing at the time of expanding or contracting the image, a device for instructing the kind of image pattern that is to be expanded or contracted, and a device for instructing the image gradation, wherein a predetermined image processing is effected depending upon these instructions.

12 Claims, 12 Drawing Sheets

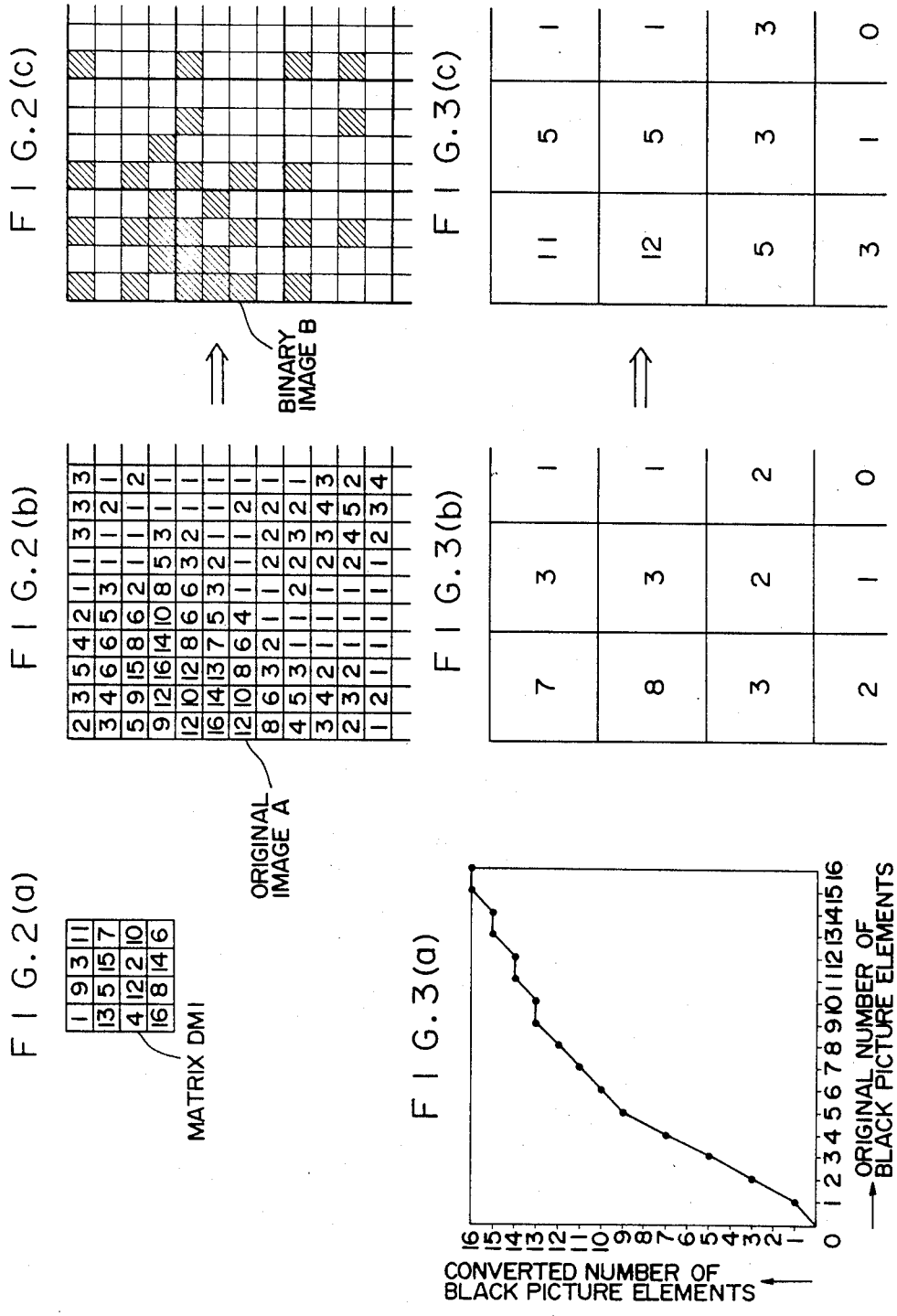

FIG. 6

$$\frac{1}{8}\begin{pmatrix} -1 & -2 & -1 \\ -2 & \alpha & -2 \\ -1 & -2 & -1 \end{pmatrix}$$

FIG. 7(a)

| 1 | 9 | 3 | 11 |
|---|---|---|---|
| 13 | 5 | 15 | 7 |
| 4 | 12 | 2 | 10 |
| 16 | 8 | 14 | 6 |

MATRIX DM2

FIG. 7(b)

| 9 | 2 | 4 |
|---|---|---|
| 23→16 | 4 | |
| 0 | | 1 |

BLOCK BK1

FIG. 7(c)

BLOCK BK1

CONTRACTED IMAGE (3/4)

EXPANDED IMAGE (5/4)

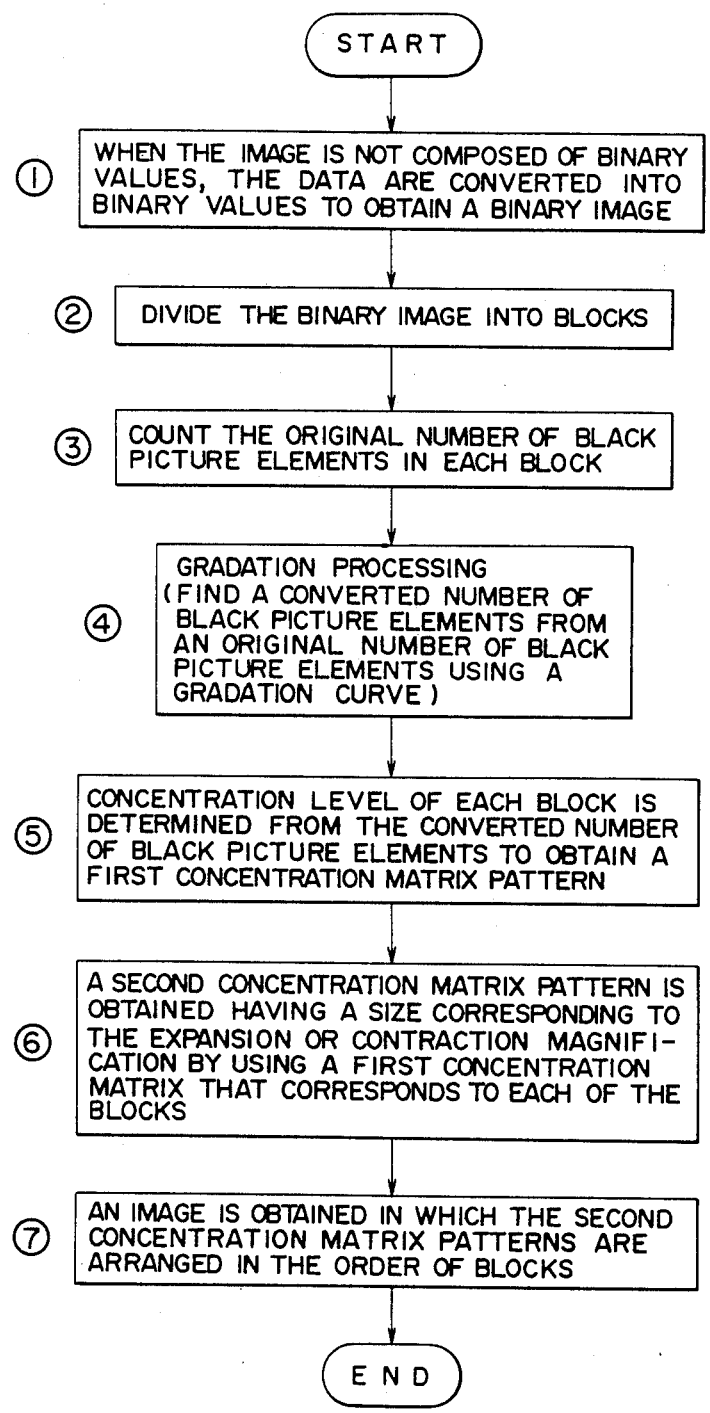

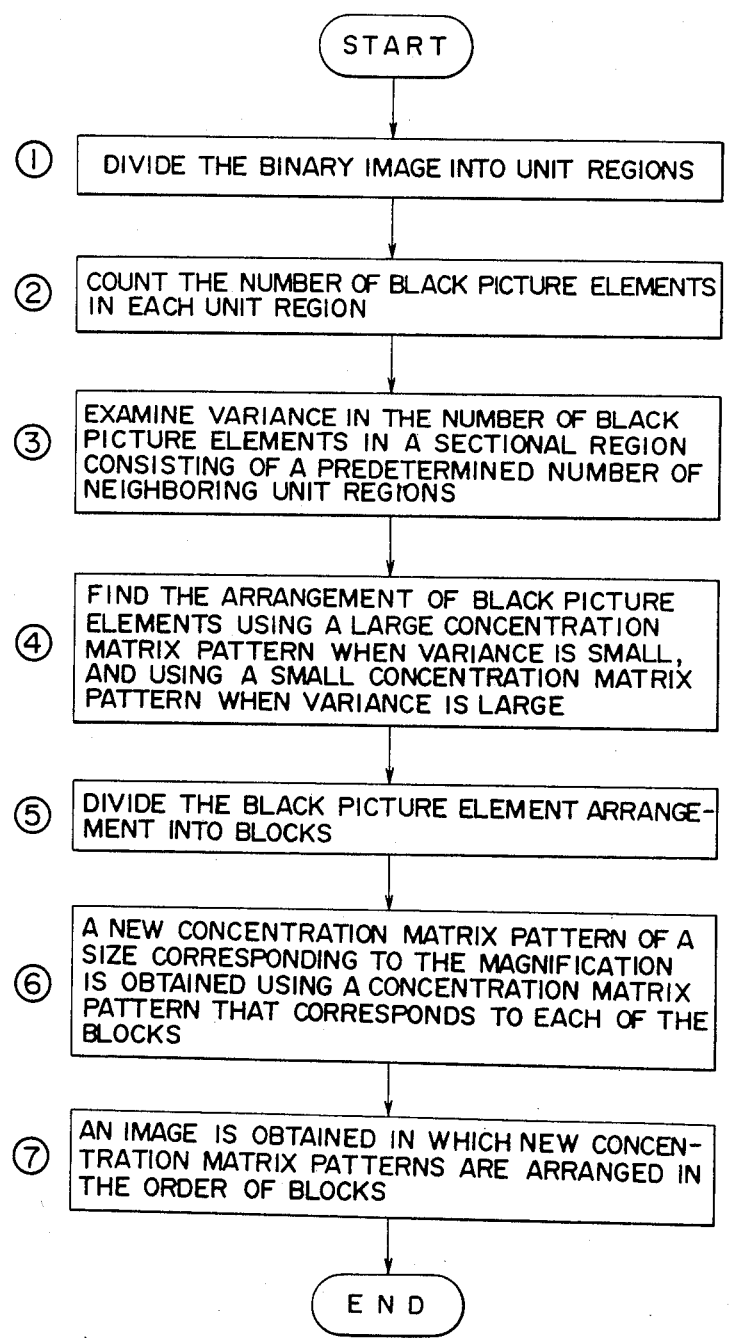

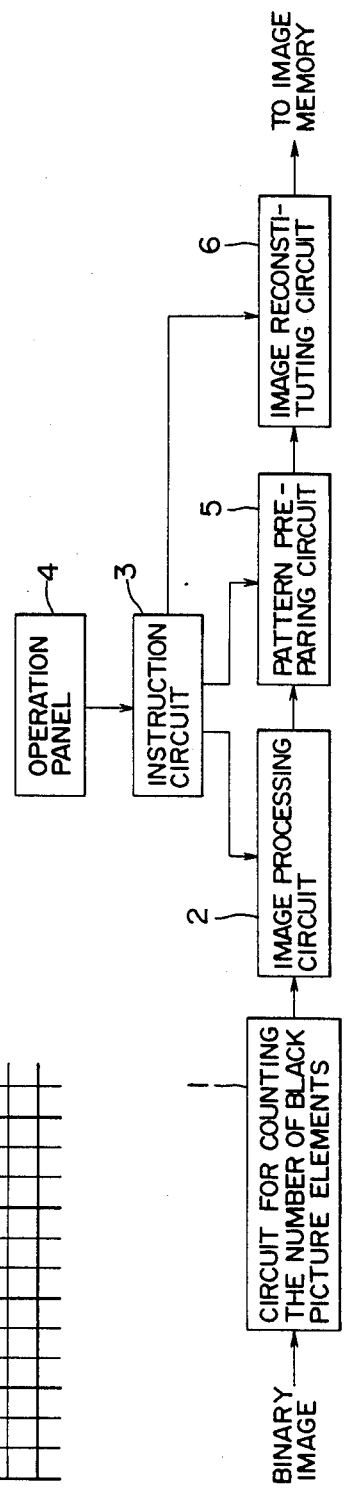
FIG. 15(a)
FIG. 15(b)
FIG. 16
FIG. 17
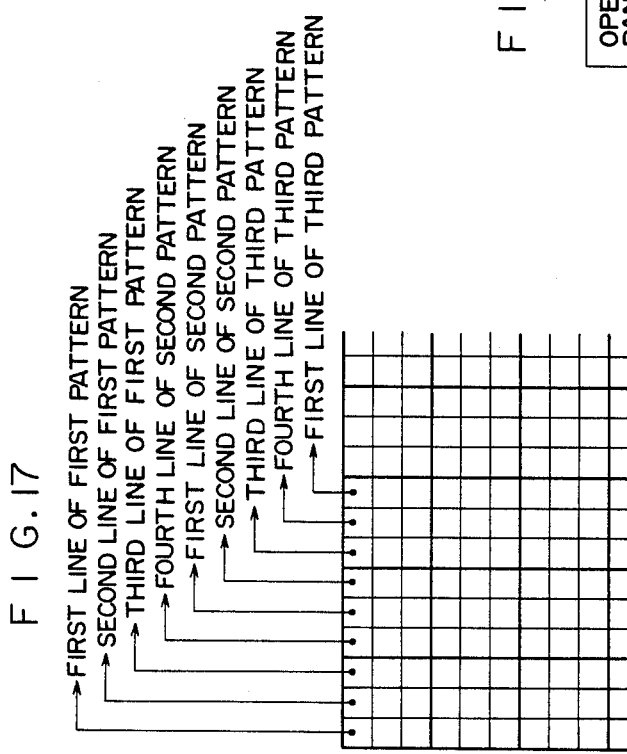

IMAGE PROCESSING METHOD AND APPARATUS THEREFOR

BACKGROUND OF THE INVENTION

1. Field of the Invention

The present invention relates to an image processing method for restoring the tonal picture from binary image (image restoring method). The gradation processing of an image, at least either the enlarging or reducing of images, and filtering (image emphasis, or the like), are effected on the basis of the image restoring method by an apparatus therefor.

2. Description of the Prior Art

A method of restoring processing images based upon binary data had not hitherto existed. As methods of enlarging (or magnification) or reducing (or reduction) the binary image relying upon the picture element density conversion system, there have been known an SPC method, an logical sum method, a divide-by-nine method, a projecting method, and the like.

It has not so far been possible to process binary data images. When the processing was not perfect, therefore, the image sensing was carried out a plurality of times while changing the image sensing conditions. moreover, it was not possible to process an image when there was no original image.

According to the conventional method of enlarging (or expanding) and reducing (or contracting) the binary image relying upon the picture element density conversion system, problems arise because lines are defaced or omitted. The greatest problem, however, is that Móire fringes develop when it is attempted to enlarge or reduce a half-tone image (tonal image) having perodic structure such as binary image expressed by an ordered dither matrix. This is because, sampling is effected twice, i.e., at the time of converting image signals into digital signals and at the time of expanding or contracting the image. Therefore, the image is often adversely affected depending upon the magnification. To eliminate this phenomenon, it has been contrived to express the image relying upon a random dither method which, however, results in complex circuitry. With the MAE method or the ED (Error Difusion) method, furthermore, a structure resembling a "striped domain" appears on the half-tone portion which some people find unpleasant. Therefore, these methods have not been placed in practical use.

In treating binary half-tone images of this kind, furthermore, no method had existed for easily effecting the filering and the gradation processing (conversion).

The conventional method of expanding or contracting the image relying upon the picture element density conversion system.has been employed in printers and in facsimile, as has been known to enlarge and reduce mainly the drawings and characters. When the methd of this type is adapted to the image having gradation, the magnification of an integer number of times is effected, and the pitch of the mesh after magnification is usually different. Further, when the image is to be magnified by a rational number of times, the image is adversely affected (Móire fringes develop) to such a degree that it is no longer used practically.

SUMMARY OF THE INVENTION

The present invention was accomplished in view of the above-mentioned problems, and its object is to provide an image processing method for restoring original tonal image and other processing method which is capable of processing binary images.

In order to solve the above-mentioned problems, the method of the present invention is characterized in that the binary image is divided into blocks, at least one of the number of black picture elements and the number of white picture elements is counted for each block, and gradation processing and/or filtering is effected for said number of picture elements.

Another object of the present invention is to provide an image processing method which is capable of easily enlarging and reducing as well as the filtering even for a binary image having periodic structure, without developing Móire fringes.

In order to solve the above-mentioned problems, the method of the present invention comprises a first step which divides the binary image into blocks, and which counts at least one of the number of black picture elements and the number of,white picture elements for each block, and a second step which subjects said number of picture elements to filtering which determines the density (or concentration) level of each of the blocks from the number of picture elements after the filtering, and which obtains a seoond density or concentration) matrix pattern of a size corresponding to the magnification of expansiOn or contraction using a first concentration matrix pattern corresponding to the determined concentration level, for each of the blocks, wherein the image reconstituted for restored by said second concentration matrix pattern is obtained as the processed image.

A further object of the present invention is to provide an image processing method which is capable of easily enlarging and reducing as well as the gradation processing even for a binary image having periodic structure, without developing Móire fringes.

In order to solve the above-mentioned problems, the method of the present invention comprises a first step which divides the binary image into blocks, and which counts at least one of the number of black picture elements and the number of white picture elements for each block, and a second step which converts said number of picture elements based upon a gradation curve, which determines the concentration level of each of the blocks from the number of picture elements that have been converted, and which obtains a second concentration matrix pattern of a size corresponding to the magnification of expansion or contraction using a first concentration matrix pattern corresponding to the determined concentration level, for each of the blocks, wherein the image reconstituted by said second concentration matrix pattern is obtained as the processed image.

Another object of the present invention is to provide a method of enlarging or reducing the image, which maintains the pitch of mesh unchanged before and after the expansion and contraction, and which can enlarge or reduce the image by several times without adversely affecting the image.

In order to solve the above-mentioned problems, the method of the present invention is characterized in that the binary image is divided into unit regions, a sectional region is formed by a predetermined number of neighbouring unit regions, the arrangement of black picture elements is found for the sectional regions where the number of black picture elements varies little in the unit regions by using a large concentration matrix pattern, the arrangement of black picture elements is found for the sectional regions where the number of black picture elements varies greatly in the unit regions by using a small concentration matrix pattern, the arrangements of said black picture elements are divided into a plurality of blocks, a mother pattern in which the patterns are two-dimensionally arranged is imagined for each of the blocks, said mother pattern is sectionalized depending upon a size which corresponds to the magnification of enlarging or reducing, the patterns having the same relation of position are cut out, and the image reconstituted by using said patterns as new patterns of the blocks is obtained as the enlarged or reduced image.

Yet a further object of the present invention is to provide an image processing apparatus which is capable of easily expanding or contracting even a binary image having periodic structure, without developing Móire fringes.

In order to solve the above-mentioned problems, the present invention deals with an image processing apparatus which obtains an enlarged image or a reduced image by effecting a predetermined image processing for an image matrix consisting of binary data, comprising at least one means among means for instructing the gradation processing at the time of enlarging or reducing the image, means for instructing the kind of image pattern that is to be enlarged or reduced, and means for instructing the image gradation, wherein a predetermined image processing is effected depending upon these instructions.

In order to solve the above-mentioned problems, the apparatus of the present invention comprises an circuit for finding the number of black picture elements for each block from a binary image matrix, an image processing circuit for converting the output of said operation circuit into other numerical values, an image preparing circuit for preparing a new image from the output of said image processing circuit, an instruction circuit which instructs an assigned position on the image of matrix patterns depending upon the magnification, for the matrix pattern of one row or one column produced from said image preparing circuit, and an image reconstituting (or reconstructing) circuit which reconstitutes (or reconstructs) the image depending upon the instruction of said instruction circuit. Further, according to the embodiments of the present invention, the restoration of the tonal image can be effected easily as well as an effective image processing can be attained by combining the gradation processing, the filtering, the magnification and the reduction.

BRIEF DESCRIPTION OF THE DRAWINGS

FIGS. 2(a), 2(b), 2(c) are diagrams illustrating an example for converting the data into binary values in the method of FIGS. 1(a), 1(b);

FIGS. 3(a), 3(b), 3(c) are diagrams illustrating the gradation processing in the method of FIGS. 1(a), 1(b);

FIG. 6 is a diagram illustrating a space filter;

FIGS. 7(a), 7(b), 7(c) are diagrams illustrating a method for obtaining a concentration matrix pattern for reconstituting the image;

FIGS. 11 and 12 are flow charts illustrating further embodiments according to the present invention;

FIGS. 15(a), 15(b) are diagrams explaining a dither matrix for obtaining the first density matrix pattern;

FIG. 16 is a block diagram illustrating an apparatus according to an embodiment of the present invention;

FIG. 17 is a diagram illustrating the reconstitution of an image when it is to be contracted;

DESCRIPTION OF THE PREFERRED EMBODIMENTS

An image processing method of the present invention will be concretely described below in conjunction with FIGS. 1 to 7.

First, a binary image which is to be processed is easily obtained by using, as a threshold value, a dither matrix of a size of, for example, $4 \times 4$ or $8 \times 8$. The width of threshold value for constituting the dither matrix should be as broad as about 0.1 to 1.4 in terms of reflection concentration in the case of a gradation picture, and should be as narrow as about 0.1 to 0.5 in terms of reflection concentration in the case of a line picture (or a fixed threshold value should be used). This is to prevent the image from being omitted or from becoming thick. Further, different dither matrix may be used for the gradation picture and for the line picture. In addition to the dither method, the data can be converted into binary values by, for example, the concentration pattern method or the network method.

Figure 1A:
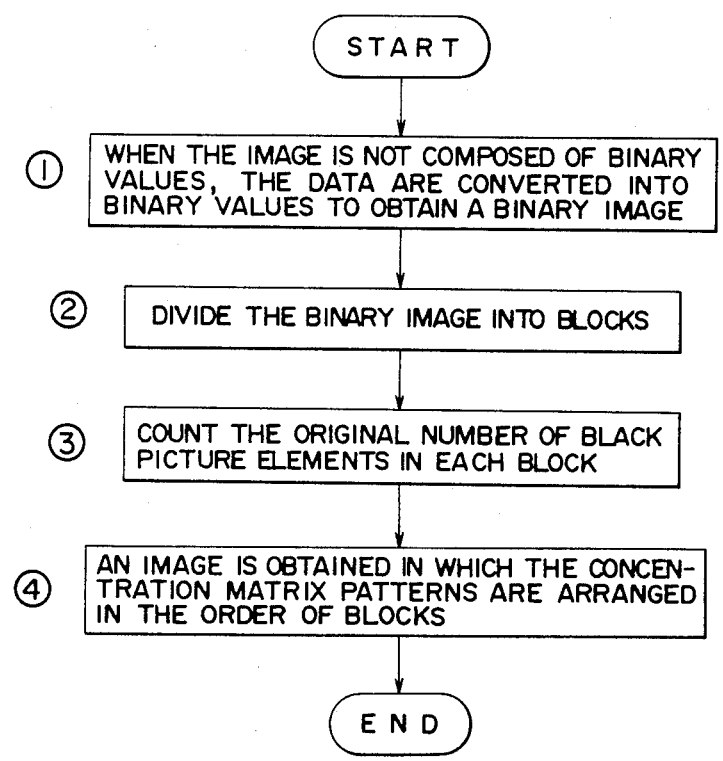
FIGS. 1(a), 1(b) are flow charts illustrating a method of the present invention.
Figure 1:
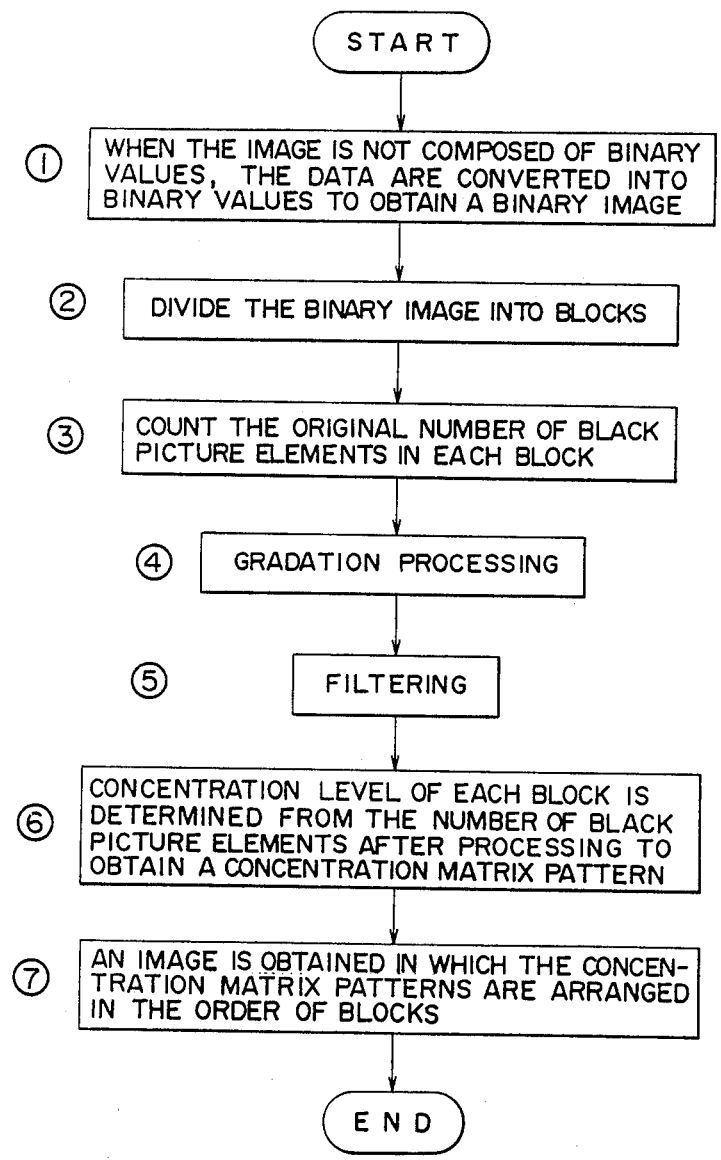

In the method of the present invention shown FIGS. 1(a), 1(b), when the image has not been composed of binary values, the data are converted into binary values (step 1). FIG. 1(a) shows especially a flow chart of the image restoring method and of the process of restoring a tonal picture from binary image. FIG. 2 shows an example where a binary image B shown in FIG. 2(c) is obtained by converting the original image A (see FIG. 2(b)) into binary values by using a dither matrix DM1 (see FIG. 2(a)) of the dot dispersion type (Bayer type) having a size of $4 \times 4$. In FIG. 2, numerals in the dither matrix DM1 and in the original image A represent normalized density levels, and hatched picture elements in the binary image B are black picture elements.

Figure 4:
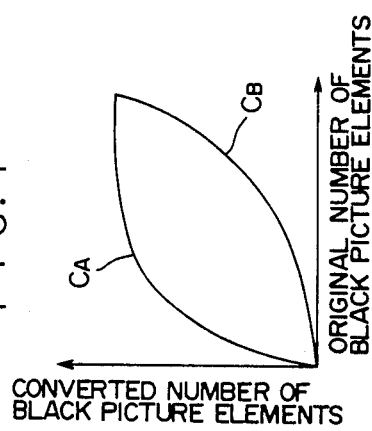
FIG. 4 is a diagram illustrating the gradation curves.

Then, a step 2 divides the binary image into blocks of a suitable size. In FIG. 2(c), the binary image is divided into blocks of a size of $4 \times 4$. The number of black picture elements (or white picture elements) in each block is counted (step 3), then the density of original is estimated and the program proceeds to gradation processing. In the gradation processing, the number of black picture elements (hereinafter referred to as original number of black picture elements) is converted into other number of black picture elements (hereinafter referred to as converted number of black picture elements) (step 4) relying upon a predetermined gradation curve. In an example of FIG. 3, the original numbers of picture elements shown in FIG. 3(b) are converted into converted numbers of black picture elements shown in FIG. 3(c) using a gradation curve shown in FIG. 3(a). What kind of gradation processing will be effected is determined by a gradation curve that is used at the time of conversion. Usually, however, if a gradation curve $C_A$ which is upwardly convex as shown in FIG. 4 is used, the number of black picture elements increases, and the frequency of high-concentraion portions increases. If a gradation curve $C_B$ which is downwardly convex as shown in FIG. 4 is used, the number of black picture elements decreases, and the frequency of low-concentration portions decreases. Therefore, the gradation curve $C_A$ is effective for a pale binary image, and the gradation curve $C_B$ is effective for an image which is darkly defaced. It is allowable as a matter of course to use, for example, an S-shaped gradation curve consisting of a combination of the gradation curves $C_A$ and $C_B$. The gradation curve should be so selected as to meet the desired gradation processing. Three to five kinds of representative gradation curves should be prepared, and the processing should be effected by the image processing apparatus by selecting any one of them that meets the image.

The above converted number of black picture elements (hereinafter referred to as a first converted number of black picture elements) is then subjected to filtering, so that the above number of black picture elements is converted into other number of black picture elements (hereinafter referred to as a second converted number of black picture elements) using a predetermined space filter (step 5). In an example of FIG. 5, use is made of a space filter shown in FIG. 5(a) in order to convert the first converted number of picture elements shown in FIG. 5(b) into the second converted number of picture elements shown in FIG. 5(c). Here, to effect the filtering to the blocks of the outer periphery requires data of black picture element numbers of the out side. From the standpoint of explanation, here, the filtering is effected by giving dotted numerals as assumed data. When the number of black picture elements after filtering becomes less than zero, it is treated as zero. When the number of black picture elements after the filtering becomes greater than 16, it is treated as 16. What kind of filtering will be effected is determined by a space filter that is used at the time of conversion. For instance, use of the space filter shown in FIG. 5(a) or FIG. 6 makes it possible to emphasize the image. In FIG. 6, $\alpha$ is a real number smaller than 20, and $\beta$ is a constant. When $\alpha$ is large, the edge can be emphasized very strongly.

The concentration level of each block is determined from the thus obtained number of black picture elements, to obtain a concentration matrix pattern (step 6). Here, the block size should be the same as the size ($4\times4$ or $8\times8$) of the dither matrix (group of threshold values) used for obtaining the binary image, or should preferably be smaller than the dither matrix. This makes it possible to maintain a high resolving power while increasing the number of gradations. FIG. 7(b) shows an image in which a second converted number of black picture elements in each block is used as a normalized average concentration level of each block, and FIG. 7(c) shows an image which is reconstituted by projecting a concentration matrix pattern on each block relying upon the second converted number of black picture elements of each block. Here, the first concentration pattern is determined by comparing the oonoentration level of each block with the dither matrix DM2 (see FIG. 7(a)) which is the same as the above-mentioned dither matrix DM1 (step 7). In the case of a block BK1, for example, the concentration level is 9. In the dither matrix DM2 of FIG. 7(a), therefore, the portions of concentration levels smaller than 9 become black picture elements, whereby a concentration n matrix pattern is formed as represented by a block BK1 in FIG. 7(c).

Here, the matrix DM1 need not be constituted to be the same as the matrix DM2; e.g., the matrix DM2 may be of the dot concentrated type (vortex type). Moreover, the order of gradation processing and the filtering may be exchanged, or only either one of them may be performed.

According to the embodiment of the present invention as described above, the binary image is divided into blocks to find an average concentration level (numbr of black picture elements or number of white picture elements), and then gradation processing and/or filtering is effected, making it possible to process the binary image.

Figure 8:
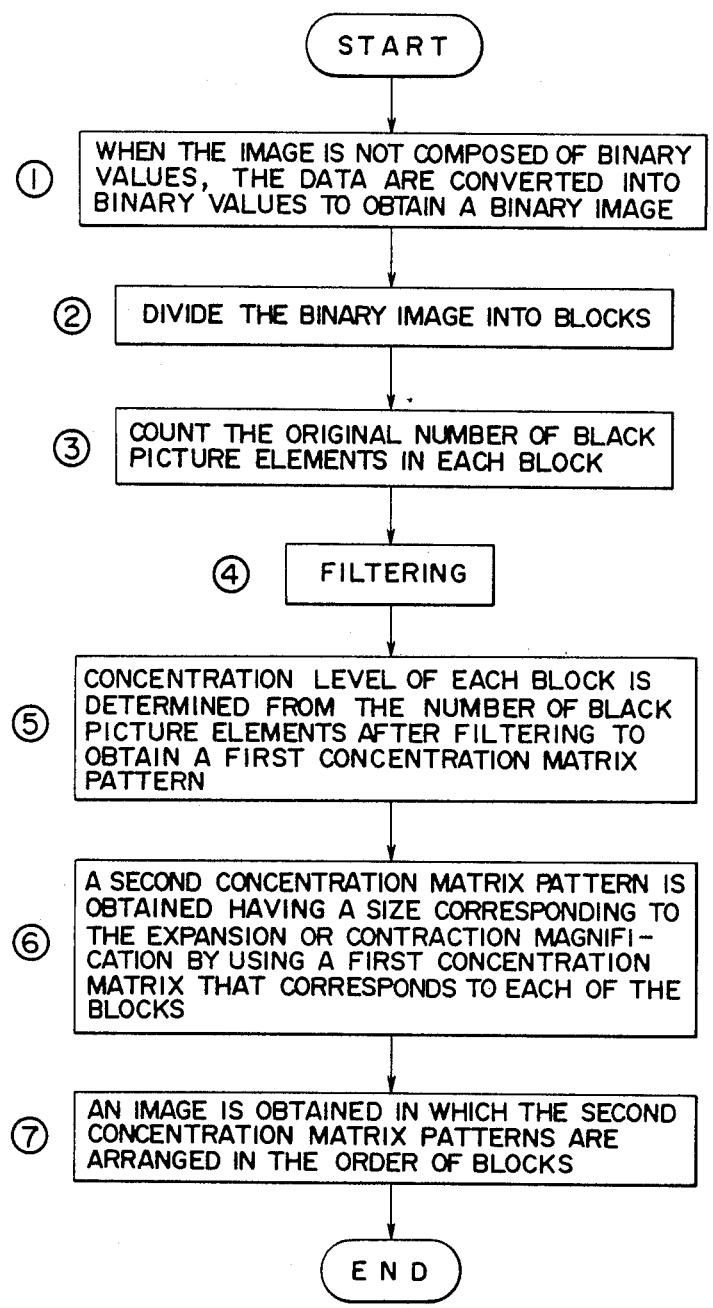
FIG. 8 is a flow chart which explains the method according to another embodiment of the present invention.
Figure 9B:
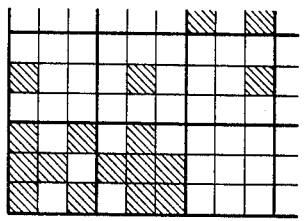
FIGS. 9(a), 9(b) are diagrams which explain a second concentration matrix pattern (magnified or reduced the method of FIGS. 1(a), 1(b)
Figure 9A:
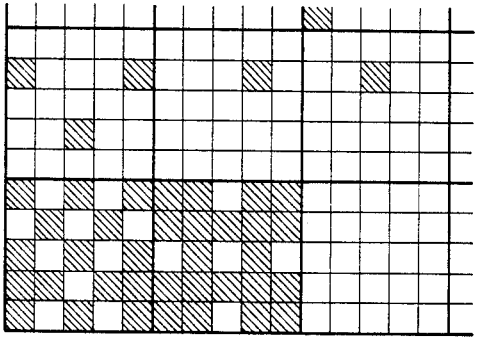

According to a second embodiment of the present invention, the program readily enters into filtering after the step 3 of the first embodiment, as shown in FIG. 8. Then, as in the first embodiment, a first concentration matrix pattern is obtained, and a second concentration matrix pattern of a size corresponding to the magnification or reducing is obtained for each of the blocks (step 6 of FIG. 8). The second concentration matrix patterns are then arranged in the order of blocks to obtain an expanded or contracted image (step 7 of FIG. 8). FIG. 9(a) shows an expanded image having an expansion magnification of 5/4 obtained as described above, and FIG. 9(b) shows a reduced image having a reduction ratio of ¾. Here, the ratio of sizes of the first and second concentration matrix patterns corresponds to the expansion or contraction magnification in the vertical and lateral directions, and the vertical and lateral sizes of the second concentration matrix pattern are obtained by multiplying the vertical and lateral sizes of the first concentration matrix pattern by the vertical and lateral expansion or reduction images. In the example of FIG. 9, therefore, the size is $5\times5$ in FIG. 9(a) an the size is $3\times3$ in FIG. 9(b).

Figure 10:
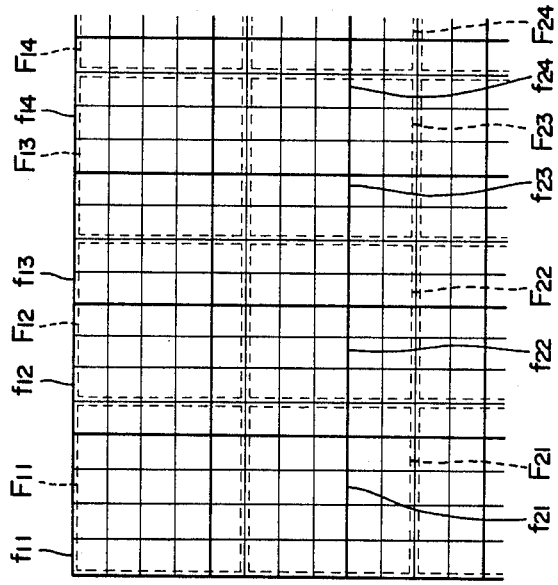
FIG. 10 is a diagram which illustrates a method of obtaining a second concentration matrix pattern from a first concentration matrix pattern.

In this embodiment, a mother pattern obtained by two-dimensionally arranging corresponding patterns in the first concentration matrix pattern, is sectionalized maintaining the size of the second concentration matrix pattern. At this moment, patterns having the same relation in position as the second concentration matrix pattern to be found, is cut out and is used as the second concentration matrix pattern. FIG. 10 is a diagram (magnification of 5/4) in which a second concentration matrix pattern is obtained from a first concentration matrix pattern. Namely, FIG. 10 shows the state where a plane consisting of blocks $f_{11}, f_{12}, f_{13}, f_{21}, f_{22}, \ldots$ of the first concentration matrix pattern (having a size of $4\times4$) is sectionalized into blocks $F_{11}, F_{12}, F_{13}, \ldots, F_{21}, F_{22}, \ldots$ of the second concentration matrix pattern (having a size of $5\times5$). First, as the second concentration matrix pattern that corresponds to the block $F_{11}$, use is made of a pattern at the position of the block $F_{11}$ which is cut out from a mother pattern in which it is assumed that the same first concentration matrix pattern corresponding to the block $f_{11}$ is contained in all of the blocks $f_{11}, f_{12}, f_{13}, \ldots, f_{21}, f_{22}, \ldots$ Similarly, as the second concentration matrix pattern that hcorresponds to the block $F_{12}$, use is made of a pattern at the position of the block $F_{12}$ which is cut out from a mother pattern in which it is assumed that the same first concentration matrix pattern corresponding to the block $f_{12}$ is contained in all of the blocks $f_{11}$, $f_{12}$, $f_{13}$, $f_{21}$, $f_{22}$, . . . That is, as the second concentration matrix pattern corresponding to the block $F_{ij}$, use is made of a pattern located at the position of the block $F_{ij}$, which is cut out from a mother pattern in which it is assumed that the same first concentration matrix pattern corresponding to a block $f_{ij}$ is contained in all of the blocks $f_{11}$, $f_{12}$, $f_{13}$, . . . , $f_{21}$, $f_{22}$, . . . FIG. 9(a) shows the image where the thus obtained second concentration matrix patterns are arranged on a plane. FIG. 9(b) also shows the same image.

Here, the matrix DM2 need not be constituted to be the same as the matrix DM1; e.g., the matrix DM2 may be of the dot concentrated type (vortex type).

More specifically, the pattern of each block after the change of magnification can be obtained by storing the mother pattern in a memory, and reading the data of a predetermined address. This, however, requires a memory of great capacity. In practice, therefore, the mother pattern is not prepared but, instead, attention is given to the periodically appearing property of the pattern. Namely, the pattern after the change of magnification is obtained by finding the concentration of the picture elements.

That is, in the case of expansion (magnification m/n), a pattern of the X-th line in the I-th block in the direction of row of a new block (block after the expansion) is equal to a pattern of the AD1-th row, $$AD1 = \mod [X + \mod [(I-1)(m-n), n] + 1 - 2, n] + 1$$

in the I-th block in the direction of row of the block before expansion. Further, a pattern in the Y-th column in the J-th block in the direction of column of a new block is equal to a pattern of the AD2-th column, $$AD2 = \mod [Y + \mod [(J-1)(m-n), n] + 1 - 2, n] + 1$$

in the J-th block in the direction of column of the block before the expansion. In the case of contraction (magnification m/n), on the other hand, a pattern of the X-th row in the I-th block in the direction of row of a new block (block after the contraction) is equal to a pattern of the Ad1-th row, $$AD1 = \mod [X + \mod [(I-1)(n-|n-m|), n] + 1 - 2, n] + 1$$

in the I-th block in the direction of row before contraction. Further, a pattern in the Y-th column in the J-th block in the direction of column of a new block is equal to a pattern of the AD2-th column, $$AD2 = \mod [Y + \mod [(J-1)(n-|n-m|), n] + 1 - 2, n] + 1$$

in the J-th block in the direction of column of the block before reduction.

Here, mod [p, q] denotes a remainder of $p \div q$, which is smaller than q, as a matter of course.

Therefore, if the picture element concentrations of each of the blocks before the change of magnification are stored in the memory, the pattern of a new block can be easily obtained by reading the picture element concentrations in the block of before the change of magnification with AD1 and AD2 as addresses in the directions of rows and columns. When the pattern of an equal magnification is to be obtained, the data of picture element concentrations of each of the blocks stored in the memory should simply be read out.

According to this embodiment of the present invention as described above, the second concentration matrix pattern corresponding to the magnification is obtained from the first concentration matrix pattern for each of the blocks. Therefore, the pitch of the mesh point remains unchanged, and Móire fringes barely develop, unlike the conventional method by which the enlarged or reduced image is obtained by changing the sampling interval. Furthermore, the image can be emphasized by effecting filtering for the average concentration level (number of black picture elements) of the block.

According to a third embodiment of the method of the present invention, the concentration level of each block is determined from the converted number of black picture elements obtained in the step 4 of the first embodiment in the same manner as the step 6 of the first embodiment, as explained in FIG. 11, thereby obtaining a first concentration matrix pattern (step 5).

After the first concentration matrix pattern is obtained, the second concentration matrix pattern of a size corresponding to the expansion or contraction magnification is obtained for each block (step 6) in the same manner as in the second embodiment. The second concentration matrix patterns are then arranged in the order of blocks to obtain an expanded or contracted image (step 7).

According to this embodiment of the present invention as described above, the second concentration matrix pattern of a size corresponding to the magnification is obtained from the first concentration matrix pattern for each of the blocks. Therefore, the pitch of the mesh point remains unchanged, and Móire fringes barely develop, unlike the conventional method by which the expanded or contracted image is obtained by changing the interval of sampling. By changing the average concentration level (number of black picture elements) of the blocks, furthermore, gradation processing can be easily achieved.

A fourth embodiment of the method of expanding or contracting the image of the present invention will be described below with reference to FIG. 12.

In the step 1 of this embodiment, the binary image is divided into unit regions UA of a suitable size as in step 2 of the first embodiment. Then, the number of black picture elements (or the number of white picture elements) is counted in each of the unit regions UA.

Figure 13B:
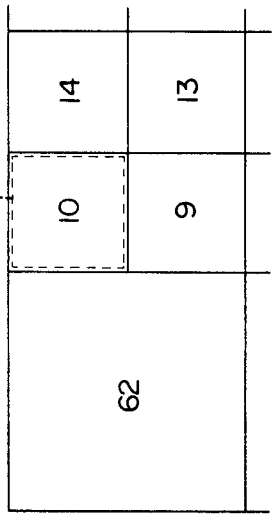
FIGS. 13(a), 13(b) are diagrams illustrating a sectional region.
Figure 13A:
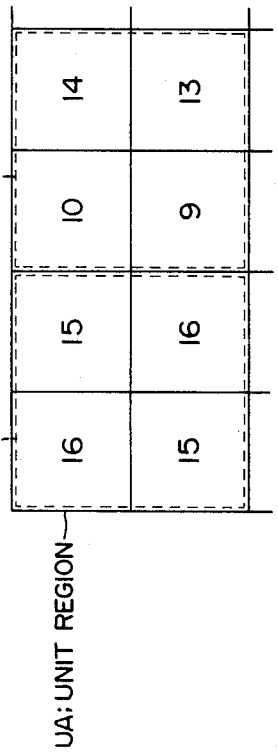

Next, a sectional region MA is formed by a plurality of neighboring unit regions UA (a matrix having vertical and lateral sides of $2 \times 2$ in this embodiment), and variance in the number of black picture elements in the unit regions UA is examined for each of the sectional regions MA (step 3). Here, an average number of black picture elements of four unit regions UA forming, for example, the sectional region MA, is calculated, and the greatest deviation (absolute value) of when the average number of black picture elements is subtracted from the number of black picture elements of each of the four unit regions, is used as a value of variance $\epsilon$. When the variance $\epsilon$ is smaller than a predetermined reference value $\epsilon_0$, arrangement of black picture elements of the sectional region MA is found using a large concentration matrix pattern. When the variance $\epsilon$ is larger than the reference value $\epsilon_0$, arrangement of the black picture elements of the sectional region MA is found using a small concentration matrix pattern (step 4). More specifically, numerals in FIG. 13(a) represent the numbers of black picture elements in the unit regions UA. In compliance with the above-mentioned method, variance $\epsilon$ in the left sectional region MA (MA$_1$) is found to be $\epsilon = 0.5$, and variance $\epsilon$ in the right sectional region MA (MA$_2$) is found to be $\epsilon = 2.5$. Here, if the reference value $\epsilon_0$ is set to be, for example, $\epsilon_0 = 1.5$, a relation $\epsilon < \epsilon_0$ is obtained in the sectional region MA$_1$ and a relation $\epsilon > \epsilon_0$ is obtained in the sectional region MA$_2$. In this embodiment, therefore, arrangement of picture elements is found using a large concentration matrix pattern for the sectional region MA$_1$ and using a small concentration matrix pattern for the sectional region MA$_2$. For instance, as for the sectional region MA$_1$, arrangement of black picture elements is found using a concentration matrix pattern of a size ($8 \times 8$) that corresponds to the sectional region MA$_2$ and as for the sectional region arrangement of black picture elements is found using a concentration matrix pattern of a size ($4 \times 4$) that corresponds to the unit region UA. FIG. 14(a) shows an image where a concentration matrix pattern is projected onto each of the sectional regions MA relying upon the number of black picture elements (see FIG. 13(b)) in a section divided into a size of the concentration matrix pattern that is used. In this embodiment, the concentration matrix pattern is determined, in the case of the $8 \times 8$ size, by comparing a dither matrix of FIG. 15(a) with the number of black picture elements (which corresponds to a concentration level) in each section, and is determined, in the case of the $4 \times 4$ size, by comparing a dither matrix of FIG. 15(b) with the number of black picture elements in each section. In the case of section K, for example, the number of black picture elements is 10. In the dither matrix of FIG. 15(b), therefore, the portions having concentration levels of smaller than 10 become black picture elements, and the concentration matrix pattern is obtained as shown in FIG. 14(a).

Figure 14B:
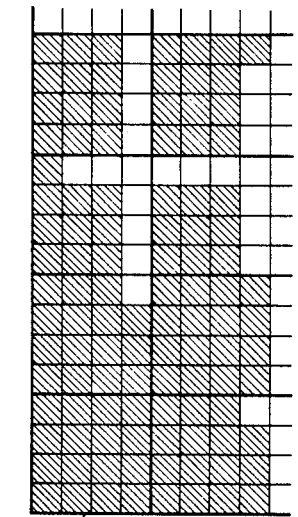
FIGS. 14(a), 14(b) are diagrams which illustrate how to divide the image into blocks.
Figure 14A:
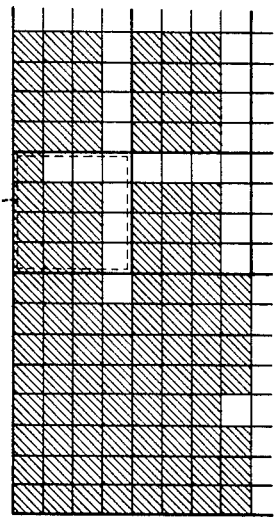

Then, the thus obtained arrangement of black picture elements is divided into blocks BK of a size of, for example, $4 \times 4$ as shown in FIG. 14(b) (step 5), to obtain a first concentration matrix pattern. Then, a new second concentration matrix pattern of a size corresponding to the expansion or contraction magnification is obtained (step 6) for each of the blocks. The second concentration matrix patterns are then arranged in the order of blocks to obtain an enlarged or reduced image (step 7 of FIG. 12) in the same manner as in the step 7 of the second embodiment.

In the above-mentioned step 4, furthermore, the image can also be emphasized (filtered) if use is made of black picture elements that are corrected by using a space filter by taking into consideration the numbers of black picture elements in the surrounding unit regions, instead of using the number of black picture elements found in the step 2. The gradation processing can further be effected if the number of black picture elements found in the step 2 is converted into another number of black picture elements based upon a predetermined gradation conversion curve. What kind of gradation processing will be effected is determined depending upon a gradation conversion curve (the abscissa representing the original number of black picture elements and the ordinate representing the number of black picture elements after conversion).

In the method of this embodiment of the present invention, furthermore, it is also allowable in the above-mentioned step 4 to use pattern of a portion of the binary image (corresponds to FIG. 2(c)) found in the step 1 as the above-mentioned first concentration matrix pattern (small size).

In this embodiment of the present invention as described above, the second concentration matrix pattern of a size corresponding to the magnification is obtained from the first concentration matrix pattern for each of the blocks. Therefore, the pitch of the mesh point remains unchanged, and Móire fringes barely develop unlike the conventional method of obtaining an enlarged or reduced image by changing the sampling interval. Furthermore, concentration matrix patterns of a plurality of sizes are prepared. In a sectional region where the concentration changes gradually, priority is given to the gradation expression rather than the resolution by using a concentration matrix pattern of a large size and in a sectional region where the concentration changes strikingly, priority is given to the resolution by using a small concentration matrix pattern. Therefore, the method of the present invention features excellent gradation and resolving power, without losing detail in expanding the image.

An embodiment of the apparatus of the present invention will be described below in detail.

FIG. 16 is a block diagram which illustrates the apparatus according to an embodiment of the present invention, wherein reference numeral 1 denotes a circuit for counting the number of black picture elements, which findsthe number of multivalue picture elements (black picture elements in this embodiment) upon receipt of binary image matrix data. As the binary image (input image data) to be applied to the circuit 1 for counting the number of black picture elements, use is made of a binary image matrix consisting of binary values obtained relying upon threshold values (such as a dither matrix). The circuit 1 divides the binary image matrix for each of the unit blocks, and counts the number of black picture elements in each of the unit blocks.

Reference numeral 2 denotes an image processing circuit which receives the output of the black picture element counting circuit 1 and converts it into other values in accordance with a concentration conversion instruction from an instruction circuit 3. Reference numeral 4 denotes an operation panel which gives to the instruction circuit 3 an instruction related to the magnification, gradation pattern, concentration conversion, and the like. The operation panel 4 is comprised of, for example, a keyboard and a CRT display unit. Reference numeral 5 denotes a pattern preparing circuit which receives the output of the image processing circuit 2 and which prepares a new pattern according to an instruction from the instruction circuit 3, and 6 denotes an image reconstituting circuit which reconstitutes the image according to an instruction from the instruction circuit 3.

The instruction circuit 3 instructs the assigned position depending upon the number of repetitions or the thinning number of matrix patterns based upon the magnification, for a matrix pattern of one line or one column produced from the pattern preparing circuit 5. The image pattern data reconstituted by the image reconstituting circuit 6 are stored in the image memory (not shown). Operation of the thus constituted apparatus will be described below.

The binary image matrix input to the black picture element counting circuit 1 has the shape as shown in FIG. 2(c). The matrix of a size 4×4 surrounded by a thick line represents a unit block, and hatched portions represent black picture elements. The block should be small so that the block structure can be reduced at the time of expanding the image. From this point of view, the unit block should have a size of about 4×4 as shown in FIG. 2(c).

Such a processing for converting the data into binary values is carried out as described below.

The black picture element counting circuit 1 converts the original image A constituted by a matrix of picture elements shown in FIG. 2(b) into binary values based on a dither matrix of 4×4 shown in FIG. 2(a). Therefore, there is obtained a binary image matrix B as shown in FIG. 2(c). The black picture element counting circuit 1 counts the number of black picture elements in each block. FIG. 7(b) shows the thus obtained numbers of black picture elements. Numerals in the blocks indicate the numbers of black picture elements.

The image processing circuit 2 receives from the black picture element counting circuit 1 the data related to black picture elements for each of the blocks as shown in FIG. 7(b), and performs the predetermined image processing depending upon the instruction from the instruction circuit 3. That is, the image processing circuit 2 regards the block of 4×4 as a single large picture element, and considers the number of black picture elements in this block to be a concentration value of a large picture element. The image processing circuit 2 effects image processings for the concentration of this large picture element as mentioned below. (1) Gradation processing Numbers of black picture elements are converted relying upon input/output conversion characteristics shown in FIG. 4. A curve $C_A$ is adapted to the processing for increasing the number of black picture elements of a pale image and for expanding the D.R., and a curve $C_B$ is adapted to the processing for decreasing the number of picture elements for an image of a high concentration and for expanding the D.R. It is of course allowable to use an S-shaped gradation curve or a like curve obtained by combining the gradation curves $C_A$, $C_B$; i.e., any gradation curve may be selected to meet the desired gradation processing. Three to five representative gradation curves are prepared, and the processing is effected by the image processing apparatus by selecting any one of them depending upon the image.

(2) Image gradation processing

Figures 5A, 5B, 5C:
FIGS. 5(a), 5(b), 5(c) are diagrams illustrating the filtering in the method of FIGS. 1(a), 1(b)

The original number of black picture elements obtained by the black picture element counting circuit 1 is converted into other numbers of black picture elements using a predetermined space filter. FIG. 5 is a diagram showing an example of processing using a space filter. If the number of black picture elements shown in FIG. 5(b) is filtered using the space filter shown in FIG. 5(a), there is obtained a conversion matrix shown in FIG. 5(c). Here, to effect the filtering to the blocks of the outer periphery requires data related to the number of black picture elements of the out side. From the standpoint of explanation, here, filtering is effected by giving dotted numerals as assumed data. When the number of black picture elements after the filtering is smaller than zero, it is treated as zero. When the number of black picture elements after the filtering becomes greater than 16, it is treated as 16. The kind of filtering to be effected is determined by a space filter that is used at the time of conversion. For instance, use of the space filter shown in FIG. 5(a) or FIG. 6 makes it possible to emphasize the image. In FIG. 6, $\alpha$ is a natural number smaller than 20. When $\alpha$ is large, the edge can be emphasized considerably strongly. The degree of emphasis can be changed by changing the value $\alpha$.

Upon receipt of black picture elements produced from the image processing circuit 2, the pattern preparing circuit 5 determines the concentration level of each of the blocks according to the instruction of the instruction circuit 3, and prepares the concentration matrix pattern. That is, the pattern preparing circuit 5 receives instruction signals such as gradation pattern, mesh pattern, mesh angle pattern and the like from the instruction circuit 3, and prepares a pattern depending upon the instruction signal.

Here, the block should have a size equal to the size (4×4 or 8×8) of the dither matrix (group of threshold values) used at the time of obtaining binary images or, more preferably, should have a small dither matrix to hold high resolution while increasing the gradation number.

It is now assumed that an instruction signal of gradation pattern is produced from the instruction circuit 3. The pattern preparing circuit 5 prepares a concentration pattern matrix which is shown in FIG. 7(c) from the output of the image processing circuit 2 that is sent for each of the blocks. That is, if the data are converted into binary values according to the dither matrix of FIG. 7(a) with numerals of each of the blocks as references, there is obtained a concentration pattern matrix shown in FIG. 7(c). When the Y addresses are successively scanned with the output data of image processing circuit 2 as X addresses, a pattern of a column or of a row of the concentration pattern matrix is produced for every increase of address by one.

Responsive to the instruction from the instruction circuit 3, the image reconstituting circuit 6 reconstitutes an image of one picture relying upon one column or one row of patterns sent from the pattern preparing circuit 5. For example, to obtain an enlarged image, the same column pattern (or row pattern) is repeated a required number of times. To obtain a reduced image, on the other hand, the image is reconstituted by thinning some of the column patterns (or row patterns) and by omitting some of the picture elements. The instruction circuit 3 gives to the image reconstituting circuit 6 the position for initiating the repetition of column pattern (or row pattern) and the finish position when the image is to be enlarged, and the position for assigning the column pattern (or row pattern) when the image is to be reduced. The image pattern of one picture reconstituted by the image reconstituting circuit 6 is stored in the image memory (not shown). The enlarged image or the reduced image that is stored is taken out as required, and is processed.

FIG. 17 is a diagram to explain the reconstitution of an image when the original image is to be reduced by a ratio of ¾. Patterns shown in FIG. 17 are those prepared by the pattern preparing circuit 5. FIG. 9 is a diagram showing an image which is reconstituted relying upon the concentration patterns shown in FIG. 7(c).

According to the apparatus of the present invention as explained above in detail, the number of black picture elements of binary image matrix of the original image is found, and the gradation processing or the image emphasis is effected for the number of black picture elements. Then, a new pattern is prepared from the concentration pattern which is processed, and the thus prepared new pattern is taken out and is subjected to various image reconstitution processing, in order to obtain an enlarged image or reduced image. According to the apparatus of the present invention, the new pattern is repeated when the image is to be expanded, and only part of the new pattern is used when the image is to be contracted. Therefore, even when an image having periodic property is to be processed, there develop no Móire fringes or change in the number of mesh lines. Therefore, the image can be processed maintaining high quality.

The apparatus according to another embodiment of the present invention will be explained below in detail.

Figure 18:
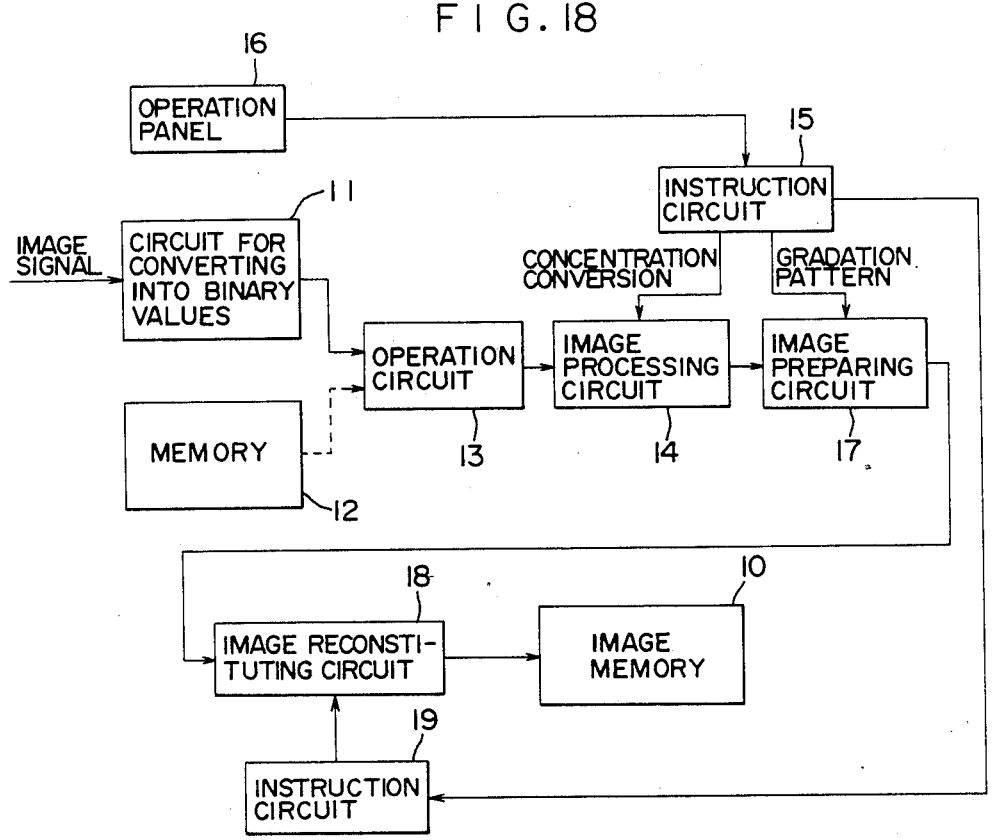
FIG. 18 is a block diagram illustrating an apparatus according to a further embodiment of the present invention.

FIG. 18 is a block diagram illustrating the structure of an embodiment of the present invention, wherein reference numeral 11 denotes a circuit for converting input image signals into binary signals, and 12 denotes a memory which stores a binary image matrix that has been obtained in advance. The circuit 11 may be of the type which converts the signals into binary signals using, for example, a dither matrix. Reference numeral 13 denotes an operation circuit which finds the number of multivalue picture elements (black picture elements) in a binary image matrix produced from the circuit 11 or the memory 12, for each of the blocks, and 14 denotes an image processing circuit which receives the output of the operation circuit 13 and which converts the output into other numerical value according to a concentration conversion instruction from a first instruction circuit 15.

Reference numeral 16 denotes an operation panel which gives to the first instruction circuit 15 the instruction related to magnification, gradation pattern, concentration conversion and the like. The operation panel 16 consists, for example, of a keyboard and a CRT display unit. Reference numeral 17 denotes an image preparing circuit which receives the output of the image processing circuit 14 and which prepares a new image according to an instruction from the first instruction circuit 15, and 18 denotes an image reconstituting circuit which reconstitutes the image according to an instruction from a second instruction circuit 19. The second instruction circuit 19 instructs the assigning positions on the image depending upon the number of repetition or the thinning number of the matrix patterns based upon the magnification, for one row or one column of matrix pattern produced from the image preparing circuit 17 according to the instruction of the first instruction circuit 15. The image data reconstituted by the image reconstituting circuit 18 are stored in an image memory 10. Operation of the thus constituted apparatus will be described below.

The circuit 11 converts the original image A consisting of a matrix of picture elements shown in FIG. 2(b) into binary values relying upon a dither matrix of 4×4 shown in FIG. 2(a). Accordingly, there is obtained a binary image matrix B shown in FIG. 2(c). Hatched regions represent black picture elements. Here, the black picture elements are those having the greatest values. The operation circuit 13 receives the binary image matrix data shown in FIG. 2(c) that are supplied from the circuit 11 or that have been stored in the memory 12, and finds the number of black picture elements by calculation for each of the blocks. Here, the block stands for a region surrounded by a thick solid line in FIG. 2(c), and is constituted by 4×4 picture elements in this case. To reduce the block structure at the time of expanding the image, the block should be small and, preferably, a size of about 4×4 as shown in FIG. 2(c). FIG. 7(b) is a diagram showing the thus obtained numbers of black picture elements.

The image processing circuit 14 receives from the operation circuit 3 the data related to the number of black picture elements for each block as shown in FIG. 7(b), and performs the operation to convert it into other numerical values. The operation is performed digitally while regarding, as an average concentration, the data which represents the number of black picture elements for each of the blocks as shown in FIG. 7(b). In this case, the image processing circuit 14 performs the processing as described below according to a concentration conversion instruction from the first instruction circuit 15. That is, numerical values shown in FIG. 7(b) are treated as average concentrations, and are converted into binary values relying upon the dither matrix of 4×4 shown in FIG. 7(a). Here, the data are converted into binary values in such a manner that picture elements of a value equal to, or smaller than, 9 in the dither matrix of FIG. 7(a) are regarded to be black picture elements, and the results are produced. The above-mentioned operation is performed for all blocks. FIG. 7(c) is a diagram showing the results of conversion.

A variety of other methods can be contrived to convert the numerical values by the image processing circuit 14. For instance, a concentration curve is instructed by the operation panel 16, and new converted numerals are obtained relying, for instance, on the ROM table look-up system. However, when it is desired to obtain an arbitrary curve instead of a fixed curve, a given curve is formed using a function generator instead of the ROM, and the output data converted from the input data are obtained in compliance with the curve.

The image preparing circuit 17 receives the thus obtained converted data from the image processing circuit 14, and prepares a new image according to the instruction from the first instruction circuit 15. For instance, the image preparing circuit receives from the first instruction circuit 15 the instruction signals such as mesh pattern and mesh angle pattern, and prepares a pattern depending upon the instruction signal. Means for preparing the pattern is the same as that of the above-mentioned embodiment.

Like the above-mentioned embodiment, the image reconstituting circuit 18 reconstitutes an image of one picture using one column or one line of patterns sent from the image preparing circuit 17 according to an instruction from the second instruction circuit 19.

Figure 19:
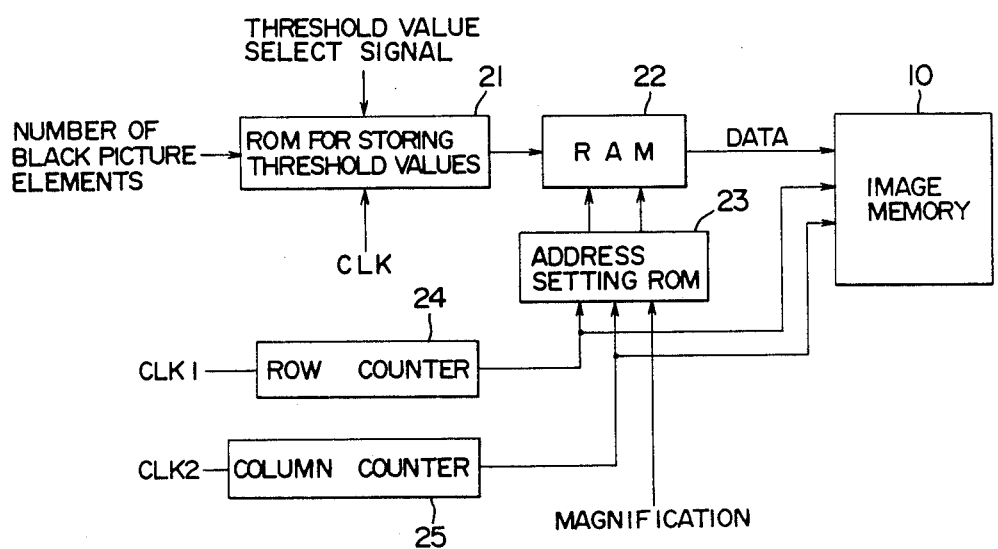
FIG. 19 is a diagram which concretely illustrates the structure of an image processing circuit.

FIG. 19 is a circuit diagram which schematically illustrates the structure of the image processing unit made up of the image processing circuit 14, image preparing circuit 17, image reconstituting circuit 18, and second instruction circuit 19. The number of black picture elements counted by the operation circuit 13 (see FIG. 18) is received by a ROM 21 for storing threshold values, and is converted into other numerical values. The conversion characteristics can be selected by a threshold value select signal. The conversion operation is performed by clock pulses CLK that are input separately.

The numerical data thus converted are applied to a RAM 22 to which have been given addresses from an address setting ROM 23. The address setting ROM 23 receives a magnification signal, output of a row counter 24 and output of a column counter 25. Upon receipt of these signals, the address setting ROM 23 gives to a RAM 22 addresses that correspond to input signals. The row counter 24 receives a first clock pulse CLK1 and the column counter 25 receives a second clock pulse CLK2. Outputs of these counters are given to the address setting ROM 23 as addresses.

Upon receipt of a magnification signal, the address setting ROM 23 judges whether the processing for enlarging the image is to be effected or the processing for contracting the image is to be effected. In the address setting ROM 23 have been stored in advance the data that correspond to the image expanding mode and to the image reducing mode. When it is confirmed which one of the modes should be effected, the address setting ROM 23 produces, as addresses, the corresponding numerical data that are stored and sends them to the RAM 22.

In the RAM 22 has been stored a pattern of n×n (n is an integer) which is determined by the number of black picture elements and the threshold pattern. The RAM 22 receives the output from the ROM 21 which stores threshold values and the output from the address setting ROM 23, as addresses for specifying rows and columns, and successively produces the data that are stored in the corresponding addresses. That is, when the image is to be enlarged as mentioned earlier, the same data is continuously produced a plurality of times. When the image is to be reduced, some addresses are skipped or portions of data are neglected. The image data thus produced are successively stored in the image memory 10 to reconstitute an expanded image or a contracted image of one picture.

According to this embodiment of the present invention, the number of black picture elements of binary image matrix of the original image is found, a concentration pattern is prepared from the number of black picture elements, a new image is prepared from the concentration pattern, (image restoring method) and the new image thus prepared is taken out and is subjected to various image-reconstituting processing in order to obtain an enlarged image or a reduced image. According to the present invention which employs portions of the new image, there develop no Móire fringes or no change in the number of mesh lines even when an image having periodic property is processed. Therefore, the image can be processed maintaining high quality.

Further, according to the embodiments of the present invention, the restoration of the tonal image can be effected easily as well as an effective image processing can be attained by combining the gradation processing, the filtering, the magnification and the reduction.

It will be appreciated that the presesnt invention can be applied not only on the binary image composed of black and white picture elements as stated in the above embodiments but also on the ternary image composed of black, grey and white picture elements or other image.

What is claimed is:

1. An image processing method comprising the steps of:
   (a) converting an original image into a matrix pattern of binary picture elements;
   (b) dividing the matrix pattern of binary picture elements into blocks of binary picture elements;
   (c) counting a number of binary picture elements occurring in each block of said divided matrix pattern;
   (d) providing the counted numbers of binary picture elements occurring in the respective blocks of said divided matrix pattern as a first concentration matrix pattern of concentration values; and
   (e) reconstituting an output matrix pattern of binary picture elements from said first concentration matrix pattern by comparing the counted number for each divided block with a dither matrix and providing output binary picture elements for each reconstituted block in accordance with said comparing step.

2. An image processing method according to claim 1, wherein said providing step (d) includes converting each of the counted numbers of binary picture elements for the respective blocks into a converted number according to a selected gradation function and using said converted numbers for the respective blocks to form said first concentration matrix.

3. An image processing method according to claim 2, wherein said providing step (d) includes converting each of the converted numbers of binary picture elements for the respective blocks into a filtered number according to a selected filtering function and using said filtered numbers for the respective blocks to form said first concentrtion matrix.

4. An image processing method comprising the steps of:
   (a) converting an original image into a matrix pattern of binary picture elements;
   (b) dividing the matrix pattern of binary picture elements into blocks of binary picture elements;
   (c) counting a number of binary picture elements occurring in each block of said divided matrix pattern;
   (d) providing the counted numbers of binary picture elements occurring in the respective blocks of said divided matrix pattern as a first concentration matrix pattern of concentration values;
   (e) reconstituting an output matrix pattern of binary picture elements from said first concentrtion matrix pattern by comparing the counted number for each divided block with a dither matrix and providing output binary picture elements for each reconstituted block having a selected number of rows and columns in accordance with said comparing step; and
   (f) magnifying or contracting said reconstituted matrix pattern into the output matrix pattern by magnifying or contracting each reconstituted block thereof as follows: (i) in the case of magnifying, by adding a row or column which repeats the binary picture elements of a bordering row or column of each block; and (ii) in the case of contracting, by deleting a bordering row or column of each block.

5. An image processing method according to claim 4, wherein said reconstituted matrix pattern is formed by blocks which are contracted to a lesser number of rows and columns than the blocks reconstituted by said dither matrix.

6. An image processing method according to claim 4, wherein said magnifying or contracting step (f) includes: reconstituting a mother matrix pattern of reconstituted blocks of binary picture elements with said dither matrix, sectionalizing said mother matrix into said reconstituted blocks and using each of said reconstituted blocks to form a respective output block of said output matrix pattern while magnifying or contracting the same according to substeps (i) or (ii).

7. An image processing method according to claim 4, wherein said providing step (d) includes converting each of the counted numbers of binary picture elements for the respective blocks into a converted number according to a selected gradation function and using said converted numbers for the respective blocks to form said first concentration matrix.

8. An image processing method according to claim 4, wherein said providing step (d) includes converting each of the counted numbers of binary picture elements for the respective blocks into a filtered number according to a selected filtering function and using said filtered numbers for the respective blocks to form said first concentration matrix.

9. An image processing method comprising the steps of:
(a) converting an original image into a matrix pattern of binary picture elements;
(b) dividing the matrix pattern of binary picture elements into blocks of binary picture elements;
(c) counting a number of binary picture elements occurring in each block of said divided matrix pattern;
(d) providing the counted numbers of binary picture elements occurring in the respective blocks of said divided matrix pattern as a first concentration matrix pattern of concentration values, wherein each counted number represents a unit region of said first concentration matrix pattern;
(e) sectionalizing said first concentration matrix pattern into sectional regions each containing a corresponding plurality of unit region, and obtaining an average variance value for the counted numbers for the unit regions of each sectional region;
(f) comparing the average variance value for each sectional region with a reference variance value to determine if it is less than or greater than said reference variance value; and
(g) reconstituting an output matrix pattern of binary picture elements from said first concentration matrix pattern by (i) in the case where said average variance value for a sectional region is less than said reference variance value, comparing the counted numbers for the corresponding sectional region with a large dither matrix having a row and column size corresponding to the sectional region; and (ii) in the case where said average variance value for a sectional region is greater than said reference variance value, comparing the counted numbers for each of the unit regions of the sectional region with a small dither matrix having a row and column size corresponding to the unit regions.

10. An image processing apparatus comprising:
(a) converting means for converting an original image into a matrix pattern of binary picture elements;
(b) processing means for dividing the matrix pattern of binary picture elements provided from said converting means into blocks of binary picture elements, counting a number of binary picture elements occurring in each block of said divided matrix pattern, and providing the counted numbers of binary picture elements occurring in the respective blocks of said divided matrix pattern as a first concentration matrix pattern of concentration values; and
(c) reconstituting means for reconstituting an output matrix pattern of binary picture elements from said first concentration matrix pattern provided from said processing means by comparing the counted number for each divided block with a dither matrix and providing output binary picture elements for each reconstituted block in accordance with said comparison.

11. An image processing apparatus according to claim 10, wherein said processing means includes image preparing means for converting each of the counted numbers of binary picture elements for the respective blocks provided into a converted number according to a selected gradation function and using said converted numbers for the respective blocks to form said first concentration matrix.

12. An image processing apparatus according to claim 10, wherein said processing means includes magnification means for magnifying or contracting said reconstituted matrix pattern into the output matrix pattern by magnifying or contracting each reconstituted block thereof.

* * * * *